(Model.)

S. B. FRANK.
Machines for Cutting Stone.

No. 227,758.  Patented May 18, 1880.

Witnesses:

Inventor
Sam'l B. Frank
Attorneys.

UNITED STATES PATENT OFFICE.

SAMUEL B. FRANK, OF NASHVILLE, TENNESSEE, ASSIGNOR OF ONE-HALF OF HIS RIGHT TO C. B. WHEELOCK & CO., OF SAME PLACE.

MACHINE FOR CUTTING STONE.

SPECIFICATION forming part of Letters Patent No. 227,758, dated May 18, 1880.

Application filed March 16, 1880. (Model.)

*To all whom it may concern:*

Be it known that I, SAMUEL B. FRANK, of Nashville, in the county of Davidson and State of Tennessee, have invented certain new and useful Improvements in Machines for Cutting Stone; and I do hereby declare that the following is a full, clear, and exact description of the invention, which will enable others skilled in the art to which it appertains to make and use the same, reference being had to the accompanying drawings, and to the letters of reference marked thereon, which form a part of this specification.

Figure 1:
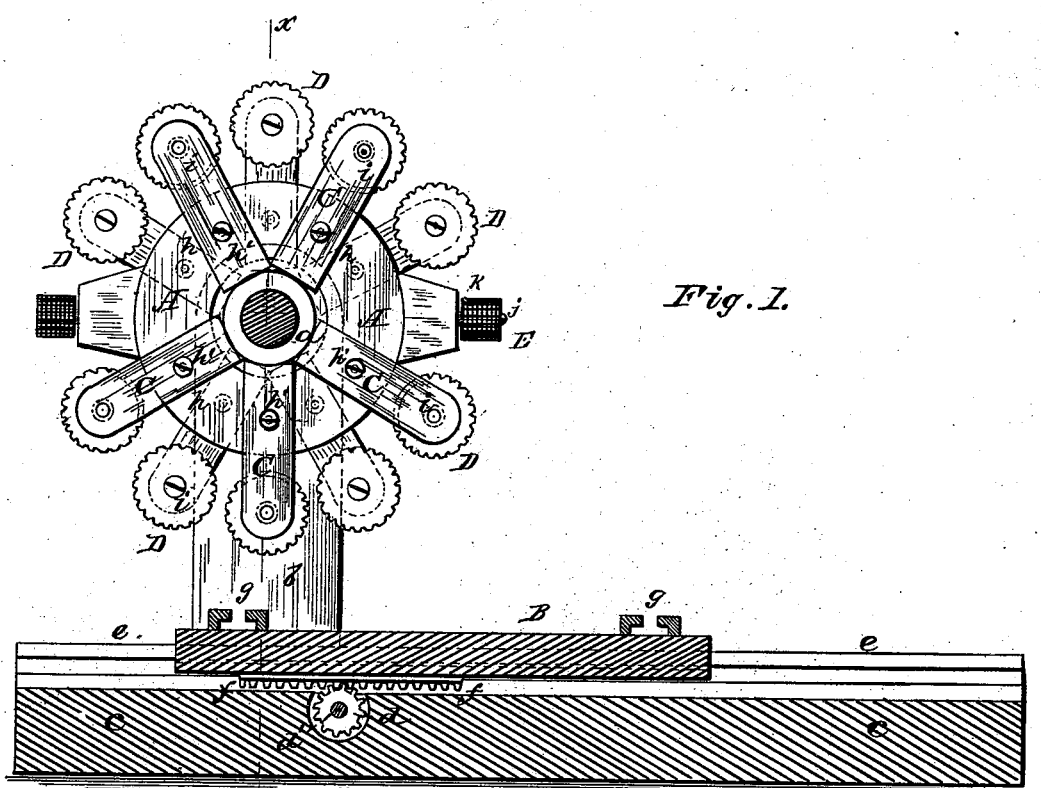
Figure 2:
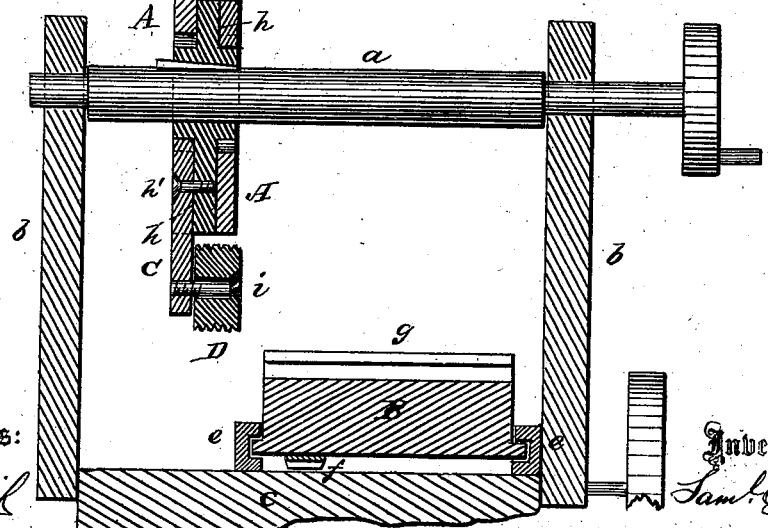

Figure 1 is a side elevation, partly in section, of my improved stone cutting and dressing machine, and Fig. 2 is a vertical section through Fig. 1.

This invention has for its object to cut and dress stone, including cutting molding thereon or channeling the stone, with the cutters rotated either vertically or horizontally with relation to the stone, and adapted to be adjusted relatively to the periphery of the carrier or wheel; and it consists of a carrier or wheel with a series of peripheral cutters, preferably adjustable, and with cutters adapted to cut at right angles to the cutting action of the others, and which are also adjustable for widening the channel being cut by the differently-cutting cutters, substantially as hereinafter more fully set forth.

In the annexed drawings, A refers to a rotary carrier or wheel, with its shaft $a$ suitably journaled in uprights $b$ $b$, firmly secured in position, with a bed, $c$, arranged between them. This bed has a pinion, $d$, on a shaft, $d'$, working transversely therein and extending out to one side of the bed, to permit it to be conveniently operated.

Superposed above the bed is a carriage, B, for holding and feeding the stone to the cutters, which slides or moves in ways $e$ of the bed, and provided on its under side with a rack, $f$, which meshes with the pinion $d$ on the shaft $d'$, while upon its upper surface, at the ends, are slotted cleats $g$ $g$, which receive the projections on the block of stone to be cut or operated on.

The carrier or wheel A is provided with radial arms C on both sides, those on one side alternating with those on the other side, as clearly shown in Fig. 1, and are capable of adjustment with relation to the periphery of the wheel by means of slots $h$ therein and set-screws or screw-bolts $h'$. These arms are provided with the cutters D, which are hung upon short axes $i$ of the arms, and are adapted to have an independent rotary motion of their own as they are rotated against the stone by the wheel A, whose shaft is adapted to be driven by any suitable motor.

The cutters are circular and serrated or corrugated or otherwise treated on the peripheries or faces, with beveled edges provided to their numerous points to effect the cutting, dressing, or channeling of the stone.

Cutters of various forms may be used with which to cut molding upon the stone, in addition to channeling in the form desired, facing and dressing the stone.

The cutters are so arranged on the arms of the wheel that each will cut beyond a line drawn around the circumference of the wheel equidistant from the edges of the said circumference.

Upon opposite sides of the wheel A are other cutters, E E, as clearly seen in Fig. 1, whose cutting-edges are at right angles to those of the cutters D D, the object of which is to cut the channel being made by cutters D on its sides, while they are also capable of lateral adjustment by screws or wrist-pins $j$, screwed through slots $k$ in said cutters into the periphery of the wheel, for widening the cutting of the channel.

The cutters D preparing the way, or, in other words, first striking and cutting the channel in the stone, they projecting beyond, or being designed to project beyond, the cutters E, avoid the laterally-cutting cutters E striking on their ends, but permit them to strike and revolve against and cut the sides of the channel. Instead of being rotated vertically, the wheel, with its cutters, may be hung so as to revolve horizontally.

I am aware that a rotary disk carrying a series of peripheral independently rotary cutters is old; also, that a rotary disk carrying side or lateral independently rotary cutters is old.

Having thus fully described my invention, I claim and desire to secure by Letters Patent—

In a stone dressing and channeling machine, the revolving disk A, provided with a series of peripheral rotary cutters, D, and with rotary cutters E, interspersed between the cutters D, and having a rotary action at right angles to that of the cutters D, whereby, with the cutting of the channel, its sides are simultaneously subjected to a cutting action, completing its formation at one operation, as shown and described.

In testimony that I claim the foregoing as my own I have hereto affixed my signature in presence of two witnesses.

SAMUEL B. FRANK.

Witnesses:
ISAAC REESE,
G. W. GATES.